April 19, 1966 G. IRWIN 3,246,589
FLASH SHUTTER WITH DOUBLE EXPOSURE PREVENTION
Filed Dec. 16, 1963 2 Sheets-Sheet 1
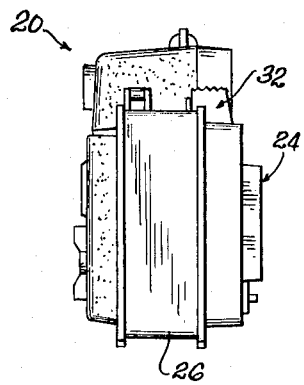
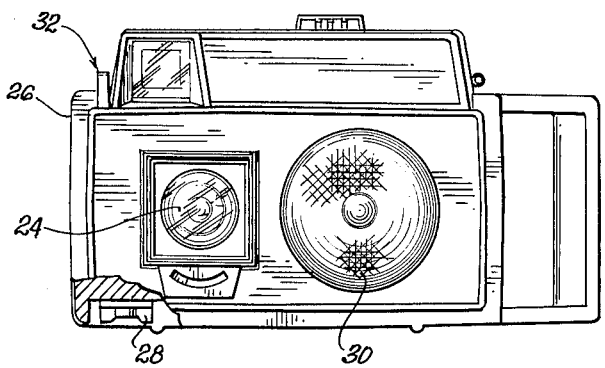
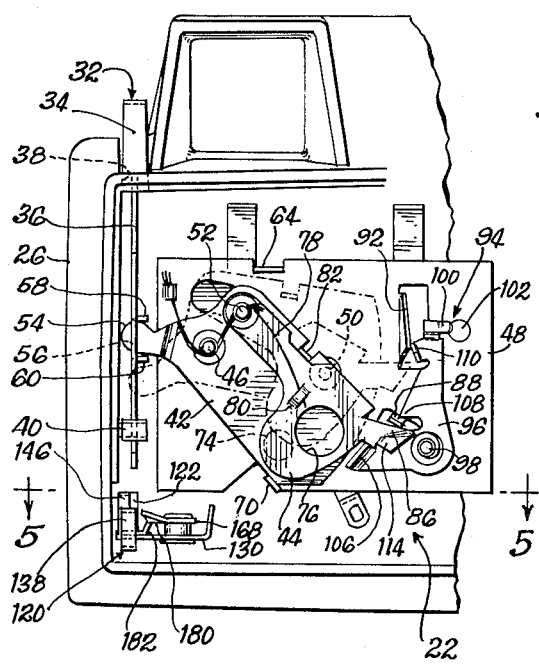
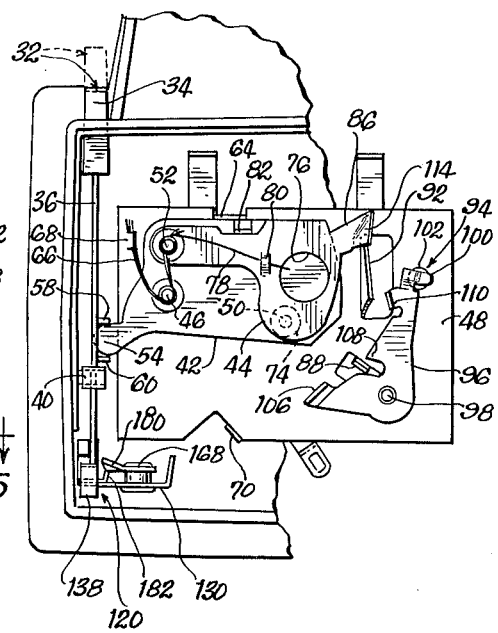
INVENTOR.
George Irwin
BY
Ooms, McDougall & Hersh
Att'ys April 19, 1966  G. IRWIN  3,246,589
FLASH SHUTTER WITH DOUBLE EXPOSURE PREVENTION
Filed Dec. 16, 1963  2 Sheets-Sheet 2
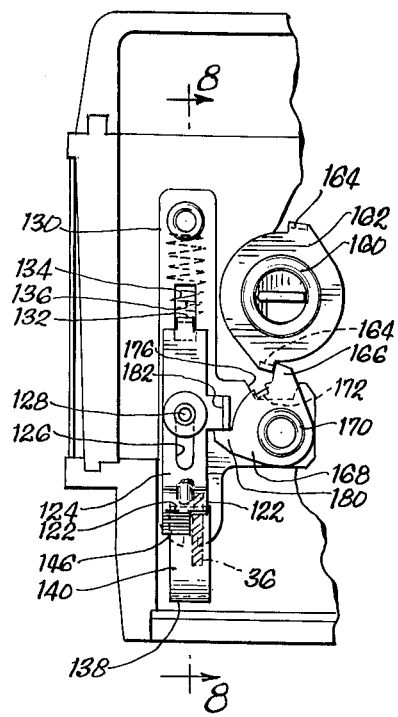
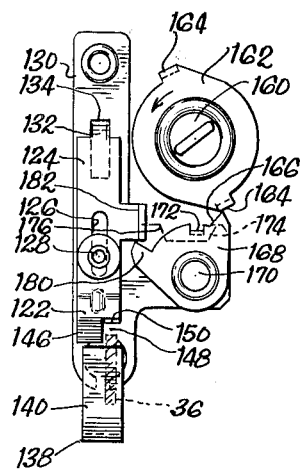
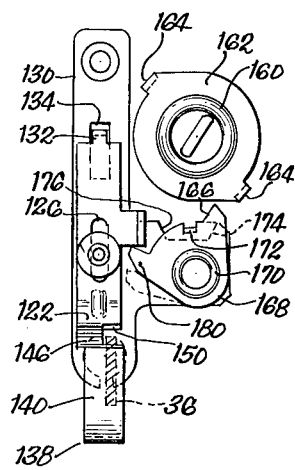
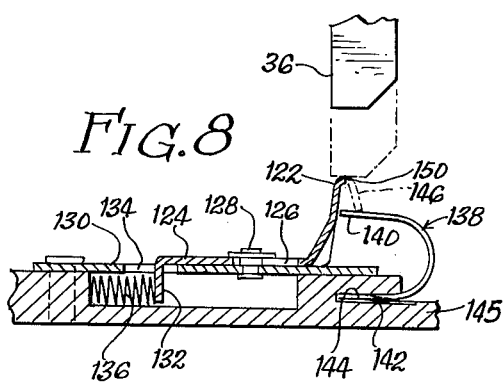
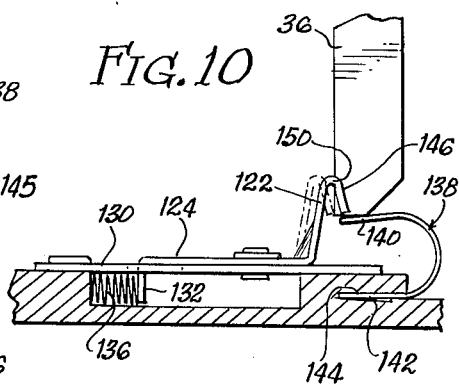
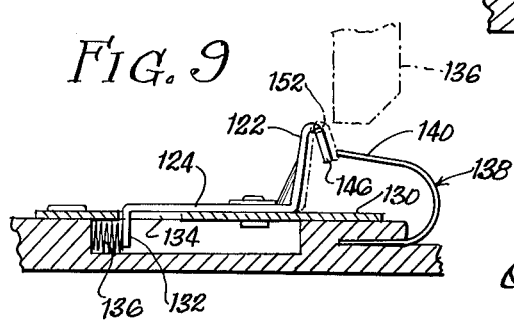
INVENTOR.
George Irwin
BY
Ooms, McDougall & Hersh
Att'ys

United States Patent Office

3,246,589
Patented Apr. 19, 1966

3,246,589
FLASH SHUTTER WITH DOUBLE EXPOSURE PREVENTION
George Irwin, Highland Park, Ill., assignor to Imperial Camera Corp., Chicago, Ill., a corporation of Delaware
Filed Dec. 16, 1963, Ser. No. 330,736
5 Claims. (Cl. 95—31)

This invention relates to photographic cameras and pertains particularly to shutters for such cameras. One object of the present invention is to provide a shutter which is provided with a new and improved switch mechanism for operating an electronic flash lamp in synchronism with the opening of the shutter.

A further object is to provide a shutter having a new and improved mechanism for preventing double exposures.

It is a further object to provide a shutter having a new and improved mechanism which prevents a second or repeated operation of the shutter, until the film advancing knob has been rotated to advance the film.

Another object is to provide such a new and improved shutter which is effective and dependable in operation, yet is highly economical in construction.

Further objects and advantages of the present invention will appear from the following description taken with the accompanying drawings in which:

FIGS. 1 and 2 are side and front elevational views of a camera incorporating the shutter mechanism to be described as an illustrative embodiment of the present invention.

FIG. 3 is a fragmentary front view with the front portion of the camera removed to show the shutter mechanism.

FIG. 4 is a view similar to FIG. 3, but showing the shutter in a changed position, at the end of the operating stroke of the shutter actuating bar.

FIG. 5 is a fragmentary horizontal section, taken generally along the line 5—5 in FIG. 3, the mechanism being shown in the position in which a second or repeat operation of the shutter is prevented.

FIGS. 6 and 7 are views similar to FIG. 5, but showing successive changes in the position of the mechanism when the film knob is rotated to advance the film.

FIG. 8 is a fragmentary vertical section, taken generally along the line 8—8 in FIG. 5 and showing the shutter mechanism in the same position as in FIG. 5.

FIGS. 9 and 10 are views similar to FIG. 8, but showing successive changes in the position of the mechanism.

As already indicated, FIGS. 1 and 2 illustrate the general appearance of a photographic camera 20 which embodies a shutter mechanism 22 to be described as an illustrative embodiment of the present invention. The illustrated camera 20 has a lens 24 which is positioned in front of the shutter 22. The shutter 22 and the lens 24 are mounted on a body or housing 26. The film may be advanced after each exposure by rotating a knob 28 mounted on the bottom of the body 26.

In this case, the camera 20 is provided with a built-in electronic flash lamp 30, which may be of the known type in which a condenser within the housing 26 is charged with a suitable power supply and then is discharged through the flash lamp, in synchronism with the opening of the shutter 22. In this case, the shutter 22 is operated by pressing downwardly upon a slidable actuating bar or plunger 32.

As shown in FIGS. 3 and 4, the shutter actuating plunger 32 has an exposed upper portion or button 34 which may be made of plastic material. The upper portion 34 is mounted on a lower portion or bar 36 which may be made of metal. The button 34 is slidable through a guide opening 38 in the housing 26. A guide 40 is provided within the housing 26 for slidably guiding the lower end of the bar 36.

The illustrated shutter 22 comprises a primary leaf or swingable plate 42, and a secondary plate or leaf 44. The primary plate 42 is swingable about a fixed pivot 46 which may be mounted on a supporting plate 48. A circular aperture or hole 50 is formed in the plate 48 and is aligned with the axis of the lens 24 so that the light converged by the lens 24 may pass through the aperture 50. The secondary plate 44 is swingable about a pivot 52 which is mounted on the primary plate 42 and is movable therewith.

It will be seen that the primary plate 42 is formed with a laterally extending portion 54 which constitutes an operating arm for the plate 42. The arm 54 is adapted to extend through an opening or slot 56 in the lower portion 36 of the operating bar 32. Flanges 58 and 60 are formed on the member 36, at opposite ends of the opening 56, to engage the opposite edges of the lever arm 54. The end of the arm 54 is rounded so as to rock freely in the opening 56. It will be apparent that the plate 42 may be swung in a counterclockwise direction (FIGS. 3 and 4) by depressing the operating bar 32 for the shutter. In FIG. 3, the bar 32 and the plate 42 are shown in their initial positions. FIG. 4 shows the shutter mechanism with the bar 32 fully depressed and the plate 42 swung as far as possible in a counterclockwise direction. The counterclockwise movement of the plate 42 is limited by a stop or flange 64 formed on the supporting plate 48.

A spring 66 is employed to return the main plate 42 in a clockwise direction. As shown, the spring 66 is made of wire and is of the hairpin type. The spring 66 is wrapped around the pivot 46. One arm of the spring 66 engages the movable pivot 52, while the other arm of the spring is retained behind a stop or flange 68 on the supporting plate 48. The clockwise movement of the plate 42 is limited by a flange or stop 70 formed on the plate 48. Initially, the spring 66 biases the plate 42 against the stop 70, as shown in FIG. 3.

The main plate 42 serves the purpose of covering the aperture 50 when the shutter is in its initial position, as shown in FIG. 3. However, the plate 42 has an opening or aperture 74 therein, which is movable into alignment with the aperture 50 when the plate 42 is swung counterclockwise to the position shown at FIG. 4.

The secondary plate 44 is also formed with an aperture 76. Initially, the aperture 76 is out of alignment with both of the apertures 50 and 74, as shown in FIG. 3. In the course of the operation of the shutter, the aperture 76 passes rapidly in front of the aligned apertures 50 and 74, so as to open the shutter for a small fraction of a second. This operation will be described in greater detail presently.

A second spring 78 is provided to bias the secondary plate 44 in a counterclockwise direction relative to the primary plate 42. The illustrated spring 78 is of the hairpin type and is wrapped around the movable pivot 52. One arm of the spring 78 engages the fixed pivot 46 and may also engage the flange 68. The other arm of the spring 78 is hooked behind a stop or flange 80 on the secondary plate 44. A stop or flange 82 is formed on the primary plate 42 to limit the counterclockwise movement of the secondary plate 44 relative to the primary plate.

In the initial position of the shutter, as shown in FIG. 3, the aperture 50 is covered by the primary plate 42. The aperture 74 is covered by the secondary plate 44. The primary plate 42 masks the aperture 76 in the secondary plate 44.

As illustrated, the secondary plate 44 has an outer end portion or arm 86 which is initially latched behind a stop or flange 88 on the supporting plate 48. When the main plate 42 is swung counterclockwise, the flange 88 prevents substantial swinging movement of the plate 44. However, the movement of the pivot 52 draws the arm 86 along the flange 88 until the arm 86 escapes from the flange 88 just before the plate 42 reaches the limit of its counterclockwise movement. The spring 78 then causes the secondary plate 44 to swing rapidly in a counterclockwise direction about the pivot 52 until the plate 44 engages the stop 82. During such movement of the plate 44, aperture 76 passes in front of the aligned apertures 50 and 74 to open the shutter. In extreme counterclockwise positions of the plates 42 and 44, the aligned openings 50 and 74 are again closed by the plate 44.

The rapid movement of the plate 44 is retarded to some extent by a flange or ramp 92 along which the arm 86 must slide as the aperture 76 passes in front of the apertures 50 and 74. The flange 92 does not stop the plate 44 but is effective to slow down the plate 44 by virtue of the friction between the flange 92 and the arm 86. The flange 92 reduces the shutter speed which otherwise might be too high to provide the desired photographic exposure.

At about the same time as the arm 86 strikes the ramp 92, it closes a switch 94 which causes the electronic lamp 30 to flash. The flashing of the lamp occurs almost instantaneously so that the shutter is still wide open when the lamp is flashed. The flash of the lamp is of extremely brief duration, only about $1/1000$ of a second.

The illustrated switch 94 comprises a plate or leaf 96 which is swingable about a pivot 98 on the supporting plate 48. The plate 96 has an end portion 100 which constitutes a movable contactor for engaging a fixed contact point 102. It will be seen that the contact 102 is mounted on the plate 48 but is insulated therefrom. The circuit for flashing the lamp 30 is connected between the pivot 98 and the contact 102. Thus, the circuit is closed by the engagement of the contactor 100 with the contact 102.

Initially, the switch plate 96 is swung in a counterclockwise direction, as shown in FIG. 3, by the engagement of the arm 86 with a flange 106 on the plate 96. To limit its counterclockwise movement, the switch plate 96 is formed with a finger or member 108 which is engageable with the fixed stop 88.

Just before the arm 86 engages the retarding flange 92, the arm 86 engages a flange or ear 110 on the switch plate 96, so as to swing the switch plate in a clockwise direction, and thereby causes the contactor 100 to engage the contact 102. The arm 86 pushes the flange 110 out of the way so that the plate 44 can complete its counterclockwise movement.

When the shutter has been operated and the bar 32 is released, the spring 66 causes the primary plate 42 to return in a clockwise direction until it engages the stop 70. The secondary plate 44 is carried along by the flange 82. Inasmuch as the apertures 74 and 76 are out of alignment, the shutter is not opened during the return movement of the plate 42. During the return movement of the secondary plate 44, the arm 86 rides over the flanges 92, 110 and 88. To facilitate such return movement, the arm 86 is formed with a trailing portion or heel 114 which is bent up at an angle to the plate 44 to act as a ramp.

The shutter 22 is provided with a mechanism 120 for preventing double exposures. Thus, the mechanism 120 prevents a second or repeated operation of the shutter until the film winding knob 28 has been rotated to advance the film to the next exposure. In this case, the mechanism 120 prevents the shutter operating bar 32 from being depressed far enough to operate the shutter for a second time.

The downward movement of the shutter bar 32 is arrested by an upwardly projecting flange or member 122 on a horizontally slidable bar 124. Suitable means are provided for guiding the slidable bar 124. As shown, the bar 124 is formed with a longitudinal slot 126. A fixed pin or rivet 128 extends through the slot 126. As shown, the rivet 128 extends upwardly from a fixed mounting strip or bar 130.

The illustrated slide bar 124 has a reduced rear portion 132 which is bent downwardly to form a tongue which is slidably received in the longitudinal slot 134 formed in the mounting strip 130.

A spring 136 may be provided to bias the slide bar 124 forwardly, into the path of the lower member 36 of the shutter bar 32. As shown, the spring 136 engages the downwardly projecting tongue 132.

The spring catch 138 is provided to latch the slide bar 124 in the rearwardly displaced position shown in broken lines in FIG. 9. In such position, the upwardly projecting stop member 122 on the bar 124 is out of the path of the shutter bar 36. As shown, the spring 138 is generally in the form of a C-shaped strip having upper and lower arms or portions 140 and 142. It will be seen that the lower portion 142 is mounted in a fixed position by being inserted and retained in a mounting slot 144 formed in a fixed member 145 on the housing 26. The upwardly projecting member 122 on the slide bar 124 has an end portion or finger 146 which is bent downwardly to cooperate with the upper arm 140 of the catch spring 138. When the bar 124 is moved rearwardly to the position shown in FIG. 9, the arm 140 springs upwardly in front of the finger 146. When the slide bar 124 is released, the finger 146 engages the arm 140, so that the arm prevents the bar 124 from being moved forwardly by the spring 136. This is the position of the mechanism after the film knob 28 has been rotated to advance the film. The stop member 122 is then out of the path of the shutter bar 36.

It will be noted from FIGS. 6 and 8 that the finger 146 is of less width than the stop member 122. Thus, it may be said that a portion of the finger 146 is cut away to form a notch 148. A shoulder 150 is formed on the top portion of the stop 122 at the rear of the notch 148.

When the shutter bar 32 is depressed, the lower end of its lower member 36 engages the upper side of the spring arm 140 and flexes the arm 140 downwardly. Such flexing of the arm 140 occurs while the shutter 122 is being operated. The arm 140 is flexed downwardly below the lower end of the finger 146, as shown in FIG. 10, with the result that the finger is released from the spring arm 140. The return spring 136 immediately causes the slide bar 124 to move forwardly, from the broken line position to the full line position of FIG. 10, until the shoulder 150 engages the rear edge of the shutter bar 36.

When the shutter bar 36 is returned upwardly to the position shown in full lines in FIG. 8, the shoulder 150 is released from the bar 36, with the result that the slide bar 124 is moved forwardly by an additional amount to the position shown in FIG. 8. In this position, the stop member 122 is in the path of the shutter bar 36, so that the bar 36 cannot move down far enough to operate the shutter 22.

FIGS. 5–7 illustrate the manner in which the slide bar 124 is moved rearwardly by the rotation of the film knob 28. The film knob 28 is mounted on a shaft 160 adapted to be connected to the spool on which the film is wound. A disc or plate 162 is secured to the shaft 160 and is formed with a pair of diametrically opposite downwardly projecting ears or flanges 164, adapted to engage the arm 166 on a lever or crank 168. It will be seen that the lever 168 is in the form of a horizontal plate which is swingable about a pivot 170, projecting upwardly from the supporting strip 130. The swinging movement of the plate 168 is limited by a tab or ear 172 which is bent downwardly from the plate and is engageable with stop shoulders 174 and 176 on the strip 130.

The disc 162 is rotatable counterclockwise (FIGS. 5 and 7) and is effective to swing the plate or lever 168 clockwise. The plate 168 is able to swing far enough clockwise to permit the ears or tabs 164 to escape from the arm 166.

The plate or lever 168 has another arm 180 which is engageable with an upwardly projecting ear or tab 182 on the slide bar 124. When the lever 168 is swung clockwise, the arm 180 pushes the slide bar 124 rearwardly until it is latched by the spring 138. The ear 164 then escapes from the arm 166 so that the winding of the film may be completed.

As already indicated, the depression of the shutter bar 32 causes the lower member 36 of the shutter bar to flex the spring arm 140 downwardly so that the spring arm is disengaged from the finger 146 on the slide bar 124. The spring 136 then moves the slide bar 124 forwardly until the shoulder 150 engages the member 36. When the member 36 is returned upwardly to its original position, the spring 136 moves the slide bar 124 forwardly by an additional amount to the position shown in FIG. 8, in which the upwardly projecting stop 122 is in the path of the member 36. In this way, a second or repeated operation of the shutter is prevented until the film knob 28 has been rotated to advance the film.

It will be recognized that the mechanism for preventing double exposures is effective and dependable. At the same time it is highly economical in construction.

Various modifications, alternative constructions and equivalents may be employed when departing from the true spirit and scope of the invention as exemplified in the foregoing description and defined in the following claims.

I claim:

1. In a camera,
the combination comprising a shutter,
a generally vertical bar movable longitudinally and connected to such shutter for operating such shutter by downward movement of said bar,
said shutter including spring means for biasing said bar upwardly,
a horizontally slidable member having an upwardly projecting stop thereon movable forwardly with said member into the path of the lower end of said bar for preventing double exposures,
a rotatable film knob for advancing the photographic film in said camera,
means operable by rotation of said film knob for moving said member rearwardly and thereby moving said stop out of the path of said bar,
spring means biasing said member forwardly,
a finger extending downwardly from said stop,
a catch spring movable upwardly by its own resilience to a position in front of said finger for retaining said member in its rearwardly displaced position,
said catch spring being positioned in the downward path of said bar and being adapted to be flexed downwardly by said bar out of engagement with said finger so as to release said member for forward movement under the impetus of said spring means,
and a shoulder on said stop for engaging said bar when said catch spring is released,
said spring means being effective to move said member forwardly to bring said stop under said bar with said bar moved upwardly away from said shoulder.

2. In a camera,
the combination comprising a shutter,
an operating member connected to said shutter and movable in one direction along a pre-determined path for operating said shutter,
said shutter including spring means for returning said operating member in the opposite direction along said path,
a rotatable film advancing member for advancing the film in said camera,
a locking member movable between first and second positions along a pre-determined path transverse to the path of said operating member,
said locking member having a stop thereon which is movable with said locking member into the path of said operating member to prevent double exposures,
spring means biasing said locking member toward said first position,
said stop being in the path of said operating member when said locking member is in said first position,
means operable by rotation of said film knob for moving said locking member from said first position to said second position,
a movable latching member for latching said locking member in said second position,
said latching member having resilient means for moving said latching member into the path of said locking member when said locking member is in said second position,
said latching member being disposed in the path of said operating member and being movable by said operating member out of latching engagement with said operating member to release said operating member for return movement by said spring means to said first position when said operating member is returned in said opposite direction after operating the shutter.

3. In a camera,
the combination comprising a shutter having an operating member connected thereto for operating said shutter,
said member being movable between an initial position and an operated position in which the shutter has been operated,
said shutter including a spring biasing said operating member to said initial position,
a locking member movable between an unlocking position and a locking position,
spring means biasing said locking member to said locking position,
said locking member having a stop thereon movable into the path of said operating member to prevent movement of said operating member to said operating position when said locking member is in said locking position,
a rotatable film winding member for winding the film in said camera,
a resetting member connected to and rotatable with said film winding member,
at least one projection on said resetting member,
a lever having a first arm engageable by said projection and a second arm engageable with said locking member for moving said locking member to said unlocking position when said film winding member is rotated,
a latching member movable into the path of said locking member when said locking member is in said unlocking position for latching said locking member in said unlocking position,
said latching member including spring means biasing said latching member into the path of said locking member,
said latching member being disposed in the path of said operating member,
said operating member being effective to move said latching member out of the path of said locking member when said operating member is moved to said operated position,
said locking member thereby being released for movement to said locking position when said operating member is returned to said initial position.

4. In a camera,
the combination comprising a shutter having an operating member movable between an initial position and an operated position in which the shutter has been operated,
said shutter including a spring biasing said operating member to said initial position, a locking member movable between an unlocking position and a locking position, spring means biasing said locking member to said locking position, said locking member having a stop thereon movable into the path of said operating member to prevent movement of said operating member to said operating position when said locking member is in said locking position, a rotatable film winding member for winding the film in said camera, means operable by said film winding member for moving said locking member to said unlocking position when said film winding member is rotated, a latching member movable into the path of said locking member when said locking member is in said unlocking position for latching said locking member in said unlocking position, said latching member including spring means biasing said latching member into the path of said locking member, said latching member being disposed in the path of said operating member, said operating member being effective to move said latching member out of the path of said locking member when said operating member is moved into said operated position, said locking member thereby being released for movement to said locking position when said operating member is returned to said initial position.

5. In a camera, the combination comprising a shutter, an operating bar movable longitudinally between an initial position and an operated position in which said shutter has been operated, said shutter including spring means for biasing said bar to said initial position, a slidable locking member movable between locking and unlocking positions and having a stop thereon which is in the path of said operating bar to prevent movement of said operating bar to said operated position when said locking member is in said locking position, spring means biasing said locking member to said locking position, a rotatable film winding member for winding the film in said camera, a resetting disc connected to and rotatable with said film winding member, at least one projection on said resetting disc, a lever having a first arm engageable by said projection and a second arm engageable with said locking member for moving said locking member to said unlocking position when said film winding member is rotated, a catch spring movable by its own resilience into the path of said locking member for latching said locking member in said unlocking position, said catch spring being disposed in the path of said operating bar whereby said bar is effective to move said catch spring out of the path of said locking member when said bar is moved to said operated position, said locking member thereby being released for movement to said locking position when said operating member is returned to said initial position.

References Cited by the Examiner
UNITED STATES PATENTS

| | | | |
|---|---|---|---|
| 1,369,753 | 2/1921 | McMahon | 95—31 |
| 1,397,132 | 11/1921 | Long | 95—31 |
| 1,611,827 | 12/1926 | Fischer | 95—31 |
| 2,271,340 | 1/1942 | Jacobson | 95—11.5 |
| 2,936,687 | 5/1960 | Bundschuh | 95—31 |

EVON C. BLUNK, *Primary Examiner.*

JOHN M. HORAN, *Examiner.*